US012639931B2

(12) United States Patent
Mars et al.

(10) Patent No.: US 12,639,931 B2
(45) Date of Patent: May 26, 2026

(54) ADAPTIVE INTELLIGENCE FOR OBJECT DETECTION VIA DYNAMIC MODEL COMPOSITION

(71) Applicants: THE REGENTS OF THE UNIVERSITY OF MICHIGAN, Ann Arbor, MI (US); Hitachi Astemo Americas, Inc., Farmington Hills, MI (US)

(72) Inventors: Jason Mars, Ann Arbor, MI (US); Zongyu Chen, Ann Arbor, MI (US); Yiping Kang, Ann Arbor, MI (US); Roland Daynauth, Ann Arbor, MI (US); Arima Hidetoshi, Farmington Hills, MI (US); Paul Liu, Farmington Hills, MI (US)

(73) Assignees: The Regents of The University of Michigan, Ann Arbor, MI (US); Astemo Americas, Inc., Harrodsburg, KY (US)

( * ) Notice: Subject to any disclaimer, the term of this patent is extended or adjusted under 35 U.S.C. 154(b) by 337 days.

(21) Appl. No.: 18/412,230

(22) Filed: Jan. 12, 2024

(65) Prior Publication Data

US 2025/0232566 A1 Jul. 17, 2025

(51) Int. Cl.
*G06V 10/82* (2022.01)
*G06V 10/764* (2022.01)
*G06V 10/77* (2022.01)
*G06V 10/774* (2022.01)

(52) U.S. Cl.
CPC .......... *G06V 10/774* (2022.01); *G06V 10/764* (2022.01); *G06V 10/7715* (2022.01); *G06V 10/82* (2022.01)

(58) Field of Classification Search
CPC ............. G06V 10/774; G06V 10/7715; G06V 10/764; G06V 10/82
See application file for complete search history.

(56) References Cited

U.S. PATENT DOCUMENTS

| 2016/0171285 | A1* | 6/2016 | Kim | ...................... | G06F 18/254 |
| | | | | | 382/103 |
| 2020/0356804 | A1* | 11/2020 | Kim | ...................... | G06F 18/217 |
| 2021/0201152 | A1* | 7/2021 | Santillán Perez | ........ | G06N 3/09 |

(Continued)

*Primary Examiner* — Syed Haider
(74) *Attorney, Agent, or Firm* — Harness, Dickey & Pierce, P.L.C.

(57) ABSTRACT

Currently, objection detection models require a large amount of training cycles on even the most powerful hardware, fundamentally limiting exploration of the model design space. This work proposes interchanging the constituent components of objection detection models without retraining to quickly build and evaluate new model designs. A typical objection detection model consists of multiple constituent components (submodels) and the conventional wisdom is to train all sub-models jointly. To alleviate this, a thin adapter is introduced that enables the recomposition of pre-trained sub-models without retraining them. In this way, a suite of new objection detection models are built with distinct accuracy and compute profiles at minimal training cost. These new models outperform by up to 3% in mAP on the COCO dataset at up to 99% less training cost when compared to conventional training approaches.

12 Claims, 6 Drawing Sheets

(56)           References Cited

U.S. PATENT DOCUMENTS

| | | | |
|---|---|---|---|
| 2023/0259740 A1* | 8/2023 | Kulkarni | G06N 3/0495 |
| | | | 706/20 |
| 2024/0104898 A1* | 3/2024 | Delp, III | G06V 10/772 |
| 2024/0177452 A1* | 5/2024 | Wang | G06V 20/56 |
| 2024/0232639 A1* | 7/2024 | Uchida | G06N 3/0464 |

* cited by examiner

Provide 2 or More Feature Extractors — 51

Provide 2 or More Object Classifiers — 52

Select Feature Extractor — 53

Select Object Classifier — 54

Introduce Translation Layers — 55

Train Translation Layers — 56

ADAPTIVE INTELLIGENCE FOR OBJECT DETECTION VIA DYNAMIC MODEL COMPOSITION

FIELD

The present disclosure relates to adaptive object detection.

BACKGROUND

Object Detection (OD) identifies objects of interest from the input image and classifies the objects into predefined classes. Object detection has wide applicability and impact in many key real-world applications, such as autonomous driving and robotics. Compared to traditional Computer Vision tasks such as image classification, objection detection task is more sophisticated as it involves both detection and classification. Furthermore, objection detection solutions often have strict accuracy and computation design constraints, varying greatly depending on the application use cases. For example, object detection for autonomous driving must meet the QoS target of real-time prediction on desktop-grade GPUs found in vehicles, while object detection for drones has a different set of requirements due to its limited space and power budget. In order to build effective and practical object detection solutions, it is crucial for us to easily explore the model design space and rapidly experiment with new models to find the optimal design for a given application.

Modern object detection models consist of multiple constituent components (sub-models), each serving a distinct function. The common wisdom has been that the sub-models need to be trained jointly. Thus, the status-quo approach is to train the entire objection detection model end-to-end on large-scale object detection datasets. However, this approach can lead to a significant amount of training cycles on even the most powerful hardware and require tedious engineering efforts to derive the optimal training configuration and hyper-parameters. In addition, it can be incredibly challenging to reproduce a given model based on the description in prior literature due to the complexity in training deep learning models. As a result, the current design exploration of object detection models has largely remained adhoc, limiting the discovery of new models potentially better suited for the design constraints of certain applications.

This section provides background information related to the present disclosure which is not necessarily prior art.

SUMMARY

This section provides a general summary of the disclosure, and is not a comprehensive disclosure of its full scope or all of its features.

A computer-implemented method is presented for constructing an object detection system. As a starting point, two or more pre-trained feature extractors are provided, where each feature extractor of the two or more feature extractors is configured to receive an image and extract features from the image. One or more pre-trained object classifiers are also provided, where each object classifier of the one or more object classifiers is configured to receive a set of features and classify the features in the set of features as an object. A given feature extractor is selected from the two or more feature extractors and a given object classifier is selected from the one or more object classifiers. The feature extractors may be further defined as a neural network and the object classifiers may be further defined as a neural network.

Next, translation layers are introduced to interconnect output from the given feature extraction to input of the given object classifier. More specifically, the translation layers are defined as convolutional neural network. In some embodiments, the translation layers consist of a convolutional layer, a batch normalization layer and an activation layer. In other embodiments, the translation layers consist of a first convolutional layer, a first batch normalization layer and a first activation layer followed by a second convolutional layer, a second batch normalization layer and a second activation layer.

Lastly, the translation layers are trained, thereby constructing an object detection system. In one implementation, training the translation layers includes retraining at least one layer of the given feature extractor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
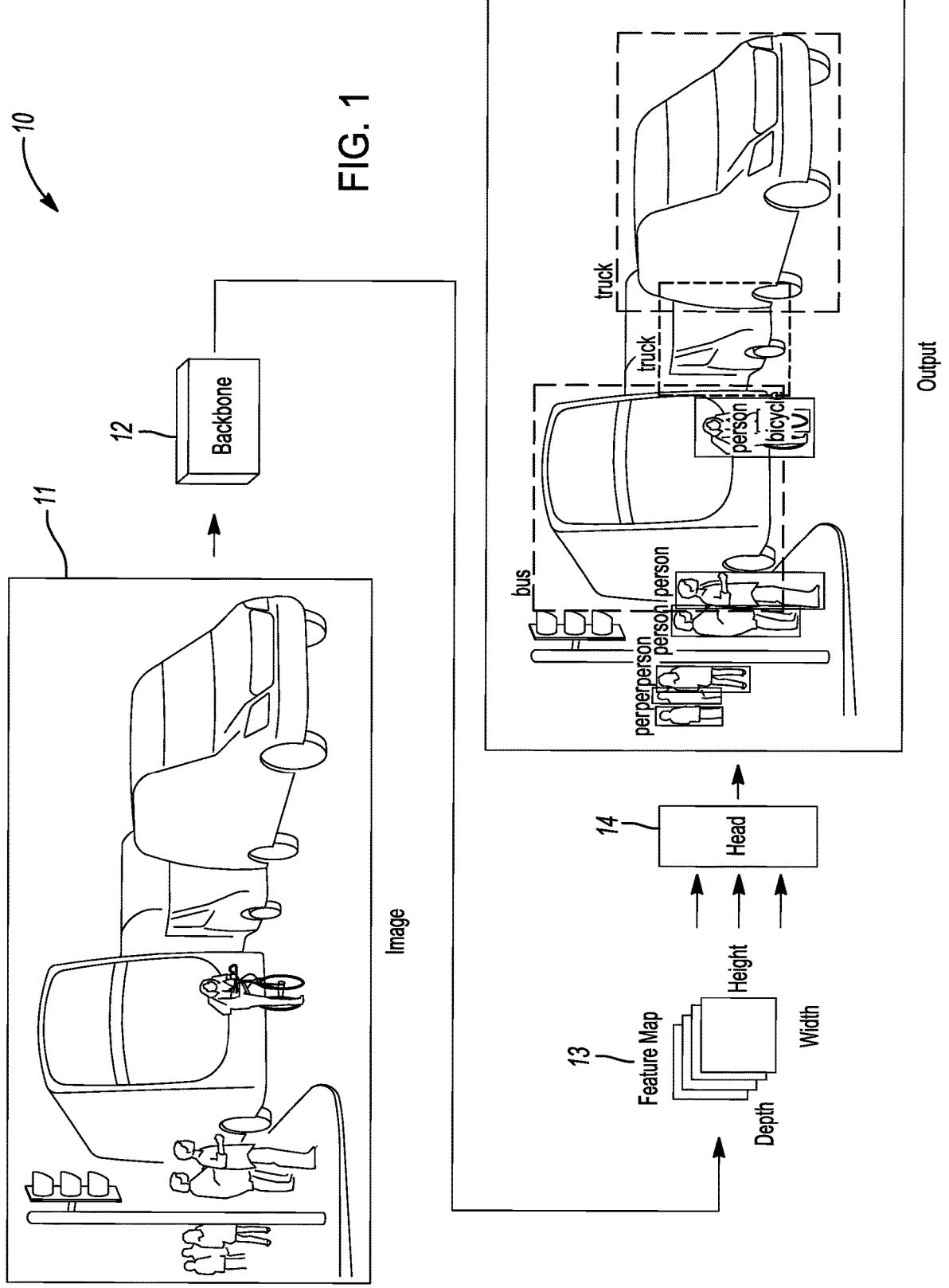
FIG. 1 is a diagram depicting a conventional object detection model.

While current state-of-the-art object detection systems 10 are designed and evaluated as one singular system, they share a common backbone-head architecture where these constituent components serve similar functionalities across systems. The backbone network 12 is used to extract basic features for detecting objects and is usually designed for the image classification task and pre-trained on, for example the ImageNet dataset. The head network 14 is used for locating the relevant objects and computing their respective classes and is trained alongside the backbone on the detection downstream task. In this multi-stage pipeline as shown in FIG. 1, the input image 11 is passed through a series of convolutional layers in the backbone 12 to produce a feature map 13 that is then passed to the head 14 for detection.

Backbones play a vital role in object detectors. The detection performance of a given object detector system relies heavily on the deep representative features that are extracted by the backbone. The backbone model given as B gives an output feature map as $N \times D \times W \times H \rightarrow DIM_B$, where N is the number of layers whose output is used as features maps and D,W,H is the depth, width, and height of these feature maps, respectively.

The head is the final stage of the object detection pipeline. The purpose of the head is to determine the position of the objects within the image and also to classify the object according to a predefined class. CNN-based object detection heads are commonly classified into two-stage detectors and one-stage detectors. Two-stage detectors, such as Faster-RCNN, propose Region Proposal Networks (RPN) to generate regions proposals that are then passed to the detection network alongside the feature maps from the backbone. Comparatively, one-stage detectors, such as single shot multibox detector (SSD) and YOLO, predict all the bounding boxes in one go through the network. In general, for all object detection heads, there are two main objective functions to minimize. The first one is the classification loss $L_{cls}$ and the second is the localization loss $L_{loc}$, such that overall loss is defined as $L=L_{cls}+L_{loc}$.

Recent object detections models introduce an additional component known as the neck. Also referred to as the feature pyramid network, the neck component augments a standard convolutional network with a top-down pathway and lateral connections so the network efficiently constructs a rich, multi-scale feature pyramid from a single resolution input image. Employing in-network feature pyramids to approximate different receptive fields can help the detector localize objects better. Conceptually, the neck can be considered as part of the head as its input is dependent on the backbone feature map, and its function assists in helping to classify objects. As such, for simplicity, the neck is considered as a component of the head in this disclosure.

Employing object detection models typically follows the following workflow. First, pre-train a base CNN model on the image classification task to act as the backbone. It is common knowledge that pre-training a new backbone (especially for large models) on ImageNet requires a large amount of computational resources. As such, pre-trained image classification models such as VGG or Resnet are used base feature extractors. Second, fine tune the feature extractor (backbone) and train the object detector head end-to-end on the object detection task using the fine-tuned feature maps outputted by the backbone.

Let B be a pre-trained object detection backbone and $\theta_B$ be the set of parameters of B. When applying B to the downstream to the task of object detection T, the model head H is attached to the backbone B. B and H are trained jointly such that:

$$\theta'_B, \theta'_H \leftarrow \arg\min L_T(D_T; \theta_B, \theta_H) \qquad (1)$$

where $L_T$ is the loss function, Dr is the ground-truth data for the OD task and $\theta_B$ and $\theta_H$ are the updated parameters of the backbone and head. Let $\Omega(\theta)$ be the computational complexity of training a set of parameters $\theta$. The computational complexity of training a traditional OD model from scratch consisting of a pre-trained imagenet backbone B and head H can be defined as:

$$\Omega(\theta'_B) + \Omega(\theta'_H) \qquad (2)$$

Next, this disclosure investigates the challenges and benefits of decomposing and recomposing object detection systems. First, explore the fusing of object detection components by manually modifying model architectures to create new network combinations and training from scratch. Next, a translation layer is presented that seamlessly allows one to glue pre-trained and dissimilar pre-trained object detection backbones and heads to work together.

Let B be a pre-trained object detection backbone of dimension $W \times H \times D \rightarrow DIM_B$ and $\theta B$ be the set of parameters of B. When combining B with a pre-trained object detection Head H out-of-the-box of dimensionality $W \times H \times D \rightarrow DIM_H$, the expected dimensionality of the backbone and head are misaligned such that $DIM_B \neq DIM_H$. Given this inconsistency, in the dimensionality of the pre-trained models, slice the fully connected layers of the pre-trained backbone and retrain the head from scratch while updating the parameters of the backbone as shown in FIG. 1.

Figure 2:
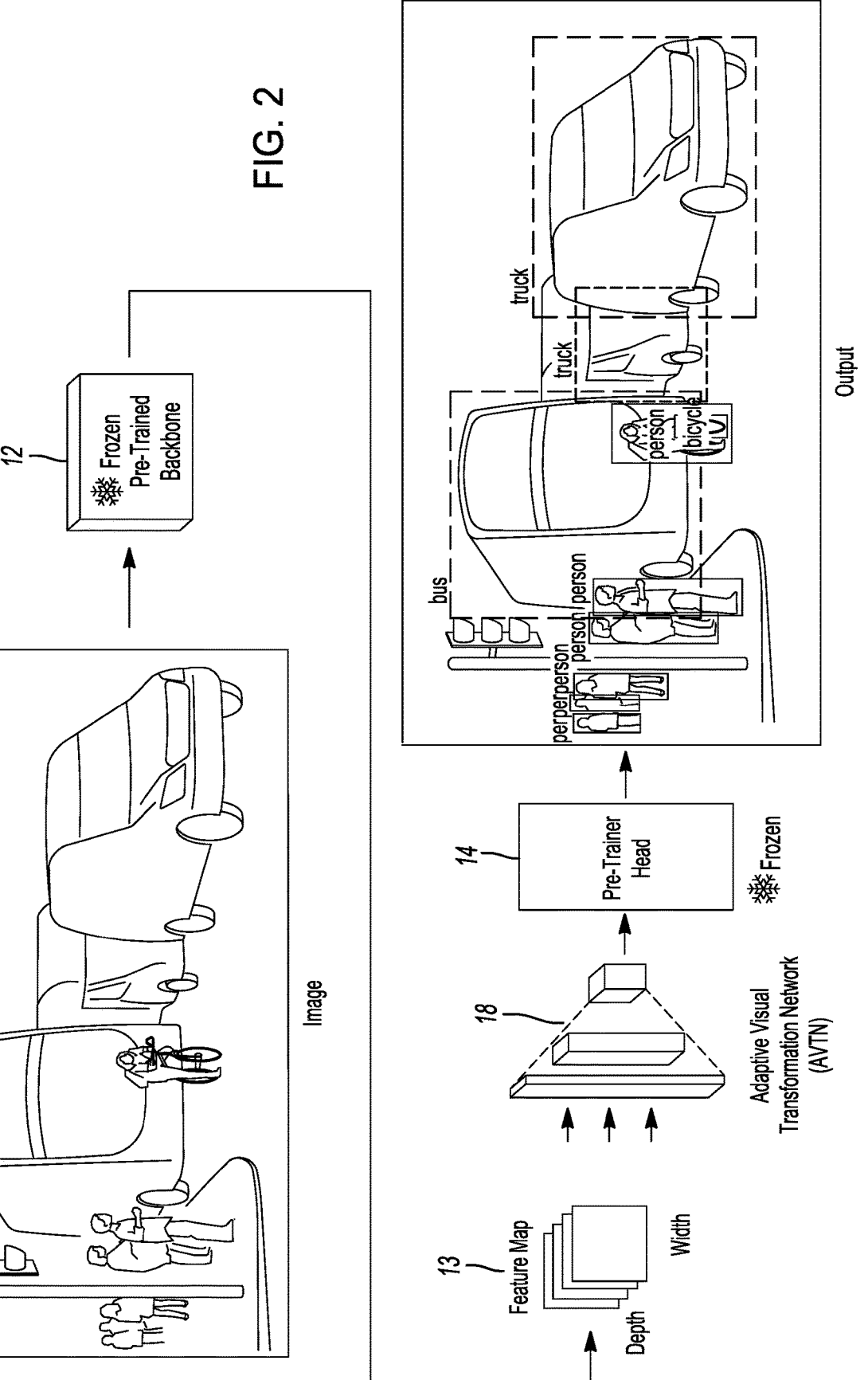
FIG. 2 is a diagram depicting an adaptive visual transformation network approach in accordance with this disclosure.

While useful in allowing one to assemble different object detection subcomponents, the fusing approach described in the previous section requires significant engineering effort to modify the varying model architectures on a case-by-case basis. In addition, this fusion still requires training the head and the backbone. As such, in order to truly benefit from the flexibility of pre-trained object detection backbones and heads, one or more translation layers 18 are presented as seen in FIG. 2. These translation layers 18 allow one to enable separate object detection components to communicate effectively with relative ease and is referred to herein as an Adaptive Visual Translation Network (AVTN).

Figure 3:
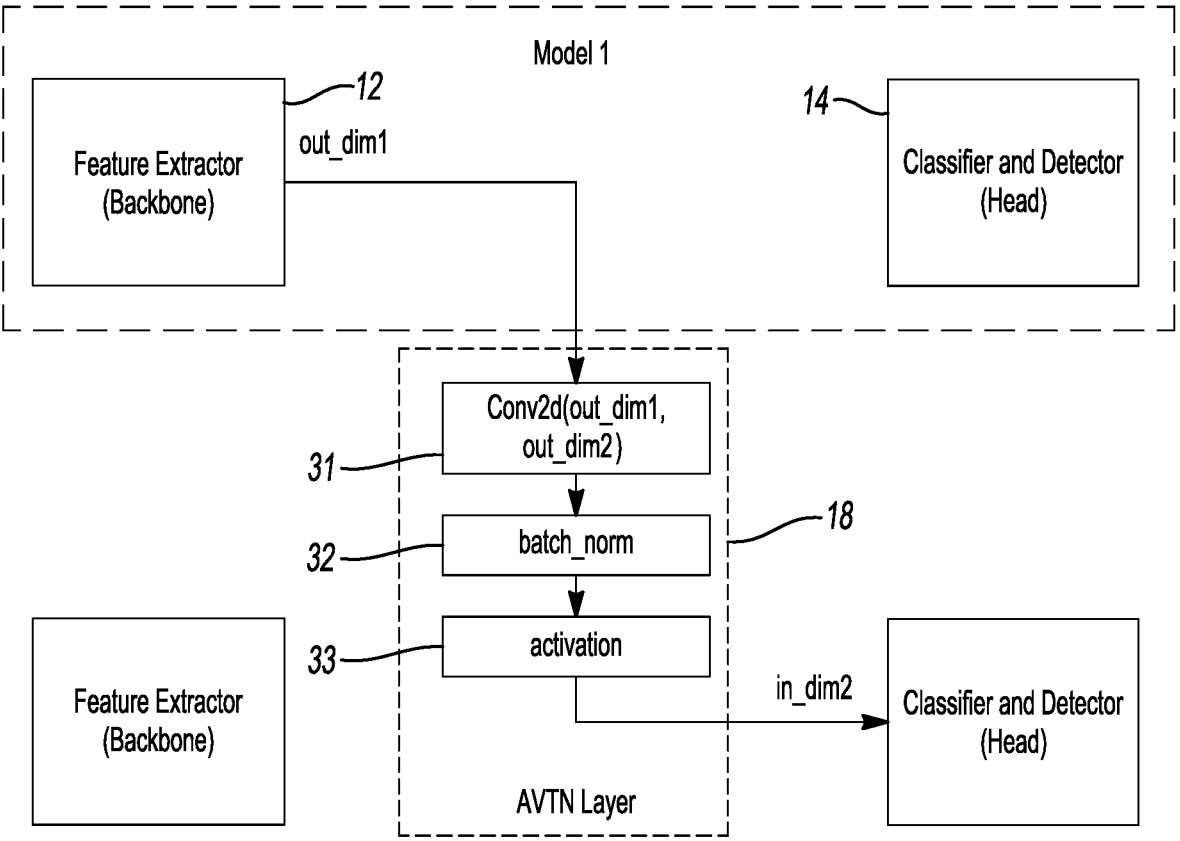
FIG. 3 is a diagram of an object detection system, where the translation layers consist of a convolutional layer, a batch normalization layer and an activation layer.
Figure 4:
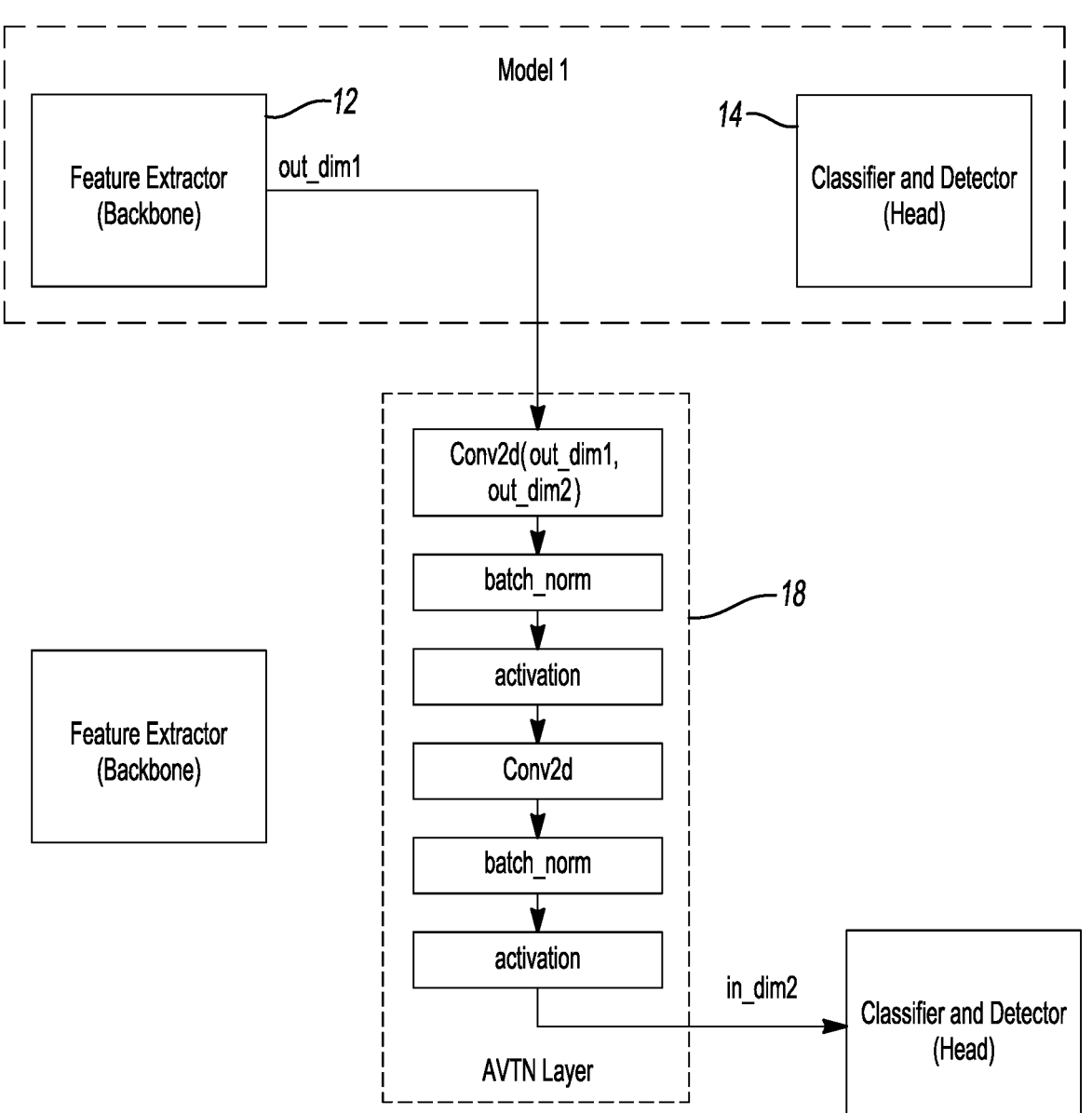
FIG. 4 is a diagram of an object detection system, where the translation layers consist a first convolutional layer, a first batch normalization layer and a first activation layer followed by a second convolutional layer, a second batch normalization layer and a second activation layer.

In order to have heterogeneous layers talk to each other, the concept of translation layers is introduced between the backbone and its intermediate network and head. Two particular layers are introduced: AVTN1 and AVTN2. AVTN1 consist of a single convolution layer 31 followed by a batch normalization layer 32 and a relu layer 33 as seen in FIG. 3 while AVTN2 consist of 2 sets of the convolution, batch norm, relu combination as seen in FIG. 4.

The translation layers 18 first infer the output and input dimensions of the backbone 12 and head 14, respectively, and adapts its input size and output size based on the depth of the expected output and input feature maps 13. The width and the height of the adaptive layer output is then determined by the kernel size, which is adjusted based on the backbone and intermediate image resolution, respectively. The backbone given as B gives an output as $N \times D \times W$ H, where N is the number of layers whose output is a features map 13, where D,W,H are the depth, width, and height of these feature maps, respectively. The translation layers 18 act as a function such that for input image X the $DIM_B(X) = DIM_H(X)$ and optimizes for the loss L such that $$L \rightarrow H(B(X)) = Y$$

where H,B is the head and backbone, and X and Y are the input image and output bounding box, classification type, and classification probability, respectively. AVTN 18 is applied using a set of frozen pre-trained backbones and the frozen pre-trained heads of popular object detection models. The computational complexity of training the AVTN layer 18 consisting of a pre-trained Imagenet backbone B and head H can be defined as:

$$\Omega(\theta'_A) \text{ where } |\Omega(\theta'_A)| < |\Omega(\theta'_H)| < |\Omega(\theta'_B)| \quad (3)$$

Given that this approach freezes the backbone, in a situation where one is exploring the landscape of AVTN and pre-trained head design one is able to accelerate this exploration by caching the backbone outputs and sharing them across the set of available head configurations. This caching alleviates the need to make forward passes through the feature extractor across runs. This vastly reduces training time in subsequent training runs due to the majority of the computational load being attributed to the backbone. Thus, making the use of pre-trained object detection components even more flexible for machine learning practitioners.

Figure 5:
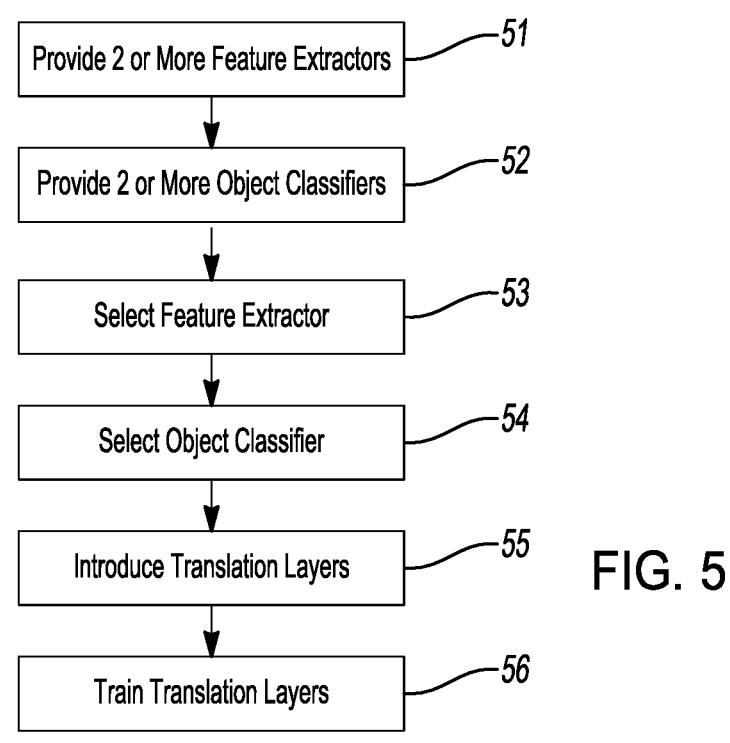
FIG. 5 is a flowchart illustrating a method for constructing an object detection system in accordance with this disclosure.

FIG. 5 further depicts this improved technique for constructing an object detection system in accordance with this disclosure. As a starting point, two or more pre-trained feature extractors (i.e., backbones) are provided at 51 and one or more pre-trained object classifiers (i.e., heads) are provided at 52. Each feature extractor is configured to receive an image and extract features from the image as is readily known. Each object classifier is configured to receive a set of features and classify the features in the set of features as an object as is readily known. In an example embodiment, the features extractors and the object classifiers are implemented as neural networks.

To construct a new object detection system, a given feature extractor is selected at 53 from the two or more pre-trained feature extractors. Likewise, a given object classifier is selected at 54 from the one or more pre-trained object classifiers.

Next, translation layers are introduced at 55. The translation layers interconnect output from the given feature extraction to input of the given object classifier. In one example, the translation layers are defined as convolutional neural networks. More specifically, the translation layers consist of a convolutional layer, a batch normalization layer and an activation layer. In another example, the translation layers consist of a first convolutional layer, a first batch normalization layer and a first activation layer followed by a second convolutional layer, a second batch normalization layer and a second activation layer.

Lastly, the translation layers are in turn trained as indicated at 56, thereby forming an object detection system. In the case of neural networks, the system is trained using forward propagation and/or backpropagation as is known in the art. Other training techniques are also contemplated by this disclosure.

Figure 6:
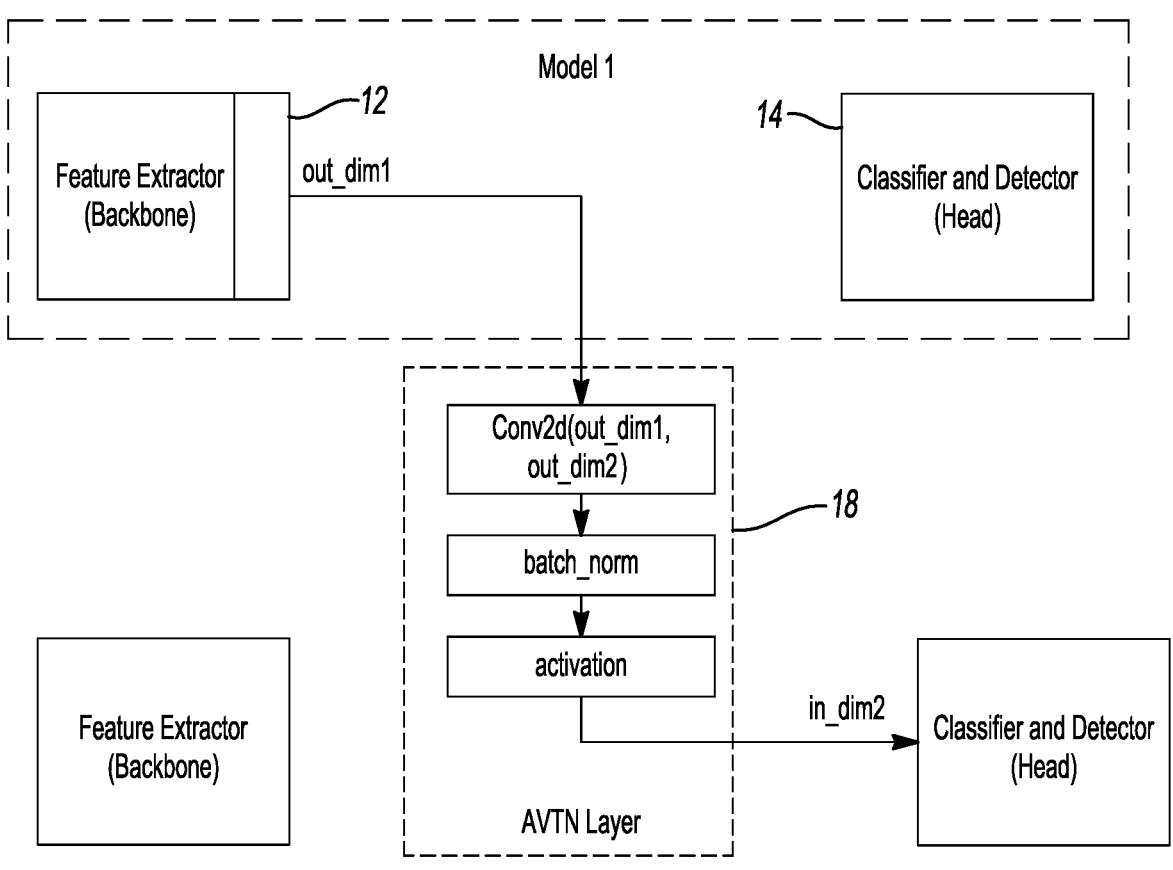
FIG. 6 is a diagram on an object detection system showing how some layers of the backbone can be unfrozen during training.

In another aspect, the translation layers are further refined by introducing some level of variability to the backbone layers. Rather than keeping the backbone layers completely frozen and only training on the AVTN layers 18, the last layer of the backbone is unfrozen to better allow it to adapt of the AVTN layers, for example as seen in FIG. 6.

As proof of concept, experiments were conducted using the COCO 2017 dataset which consists of 80 object classes and 118K/5K train/test examples. The experiments were conducted on an RTX 3090 GPU. The example implementation is based in pytorch using the Torchvision library. Each of the pretrained backbones and heads evaluated are taken from the Torchvision library1. To test the accuracy of the model, average precision (AP) is used with different IoU thresholds from 0.5 to 0.95, i.e., mAP, AP50, AP75, APS, APM and APL. MAP measures the confidence threshold of the classification of the object being detected against the intersection over union between the detected bounding box and the ground truth.

For training, a pre-trained backbone on is taken from the Torchvision library. Each input image is resized to 300×300 with the shortest size padded to make up for the extra pixels. The pre-trained backbone is then attached to the AVTN and/or its respective pre-trained head. For the fused approach, the backbone and head are fine-tuned for a total of 50 epochs. When using AVTN, the backbone and head are frozen and the AVTN layer is trained for a total of 50 epochs. A variable learning rate is used, for example starting at 0.0002 and increasing at epochs 32 and 40 while using Stochastic Gradient Decent (SGD) as the optimizer.

For the objection detection component switching task, consider the following state-of-the-art pre-trained model components: VGG16, ResNet, MobileNetV2 and V3 and SSD and SSD Lite.

VGG16 stands for Visual Geometry Group. It is a Deep Convolutional Neural Network for large-scale image classification. VGG consists of a total of 13 convolutional layers and 3 fully connected layers both with a filter size of 3×3. VGG is a state-of-the-art image classification model that is commonly used as a feature extractor for object detection models, such as SSD and RCNN. VGG16 is one of the available backbones in this work.

ResNet incorporates what is known as residual functions to its layer inputs. Instead of expecting a set of stacked layers to directly fit a desired underlying mapping, residual nets lets these layers fit to a residual mapping instead. ResNet stacks residual blocks on top of each other to form its network. In this work, ResNet-50 has fifty layers using these residual blocks. ResNet is a powerful image classification model that is deeper than VGG nets while still having lower complexity. It is widely used in object detection models as a feature extractor such as Retina-Net and Faster RCNN. ResNet is one of the available backbones in this work.

MobileNetV2 and V3 is a convolutional neural network designed for mobile and embedded vision applications. Its architecture uses depthwise separable convolutions to build light weight deep neural networks that can have low latency for mobile and embedded devices. V2 of MobileNet utilizes an inverted residual structure where the residual connections are between the bottleneck layers. The intermediate expansion layer uses lightweight depthwise convolutions to filter features as a source of non-linearity. As a whole, the architecture of MobileNetV2 contains the initial fully convolution layer with 32 filters, followed by 19 residual bottleneck layers. MobileNetV3 expands on this further by tuning itself mobile usage through a combination of hardware-aware network architecture search (NAS) complemented by the NetAdapt algorithm and then subsequently improved through novel architecture advances. In this work, MobileNetV2 and the small and large variants of MobileNetV3 are used as available backbones.

The SSD model as a whole uses a CNN backbone, where it passes the input image through the backbone CNN and takes the convolutional outputs from different levels of the feature map outputs. These feature maps are then passed through the Classification and Regression heads which are responsible for predicting the class and the location of the boxes. Each level of the feature map uses a separate 3×3.

Convolution to estimate the class logits and box locations. SSDlite is an adaptation of SSD which was first introduced in MobileNetV2 and reused in MobileNetV3. SSD Lite replaces the regular convolutions used in SSD with separable convolutions. These heads use 3×3 Depthwise convolutions and 1×1 projections. For the purpose of this work, the pre-trained classification and regression heads of SSD and SSD lite are used as available heads.

The potential of creating new object detection model designs is evaluated by combining sub-models that were not originally designed jointly. Table 2 shows the performance and # trainable parameters for all the OD models evaluated in this work. All models share the same training configuration as described above and are trained and evaluated on the COCO 2017 dataset.

The feasibility and potential benefit of connecting sub-models that were not originally trained or designed together is evaluated. To this end, select the SSD and SSDLite models as the baseline, which were introduced with VGG and variants of MobileNet as their original backbones, respectively. Train and measure the results for the available models on the COCO 2017 dataset and report the results in Table 2.

Create seven new object detection models from existing model architectures. Fuse with the SSD head, ResNet-34, ResNet-50, and three versions of MobileNet (V2, V3-Small, and V3-Large) to create novel object detection model designs. Similarly, fuse with the SSDLite head, ResNet-34, and ResNet-50. The first and second sections of Table 2 show the APs and # trainable parameters for the fused models compared with the available model designs.

Several interesting insights were observed when mixing and matching backbone and head. First, observe an improvement in performance and # training parameters of SSDResNet-50 compared against the available SSD-VGG baseline. This is aligned with the performance of ResfNet and VGG on image classification, where ResNet outperforms VGG in accuracy with a smaller model. Similarly, SSDLite with ResNet backbones outperforms the available SSDLite design which is equipped with MobileNet backbones. This proves our hypothesis that backbones and heads can be interchanged outside the conventional publicly available combinations and it can lead to new designs with novel and interesting design characteristics.

Furthermore, observe that ResNet-34 and ResNet-50 achieve similar accuracy when fused with SSDLite. This might seem counter-intuitive as ResNet-50 is larger and more robust than ResNet-34, thus expected to perform better as a backbone. The intuition here is that when connected with a larger-scale backbone such as ResNet, SSDLite becomes the bottleneck due to its relatively compact model architecture. This insight is corroborated with the trend that ResNet50+SSD outperforms ResNet34+SSD, as SSD is more complex than SSDLite.

Next, creating new OD models with AVTN as the adapter is evaluated. Leverage pre-trained backbone and head sub-models from publicly available OD models, connect them via AVTN and only train the AVTN weights while keeping the backbone and head sub-models frozen. Create three new models leveraging AVTN and Table 2 shows their performance.

Observe that new models created with AVTN perform better than the fused versions which are trained end-to-end. SSD-ResNet-50 achieves mAP of 21.6 compared to 18.1 of its fused counterpart. Similarly, SSDLite-ResNet-50 and SSD-MobileNetV3-Large outperform the fused version of the same sub-model combination by 3.0 and 2.6 mAP, respectively. Attribute the increase in performance to the additional weights introduced with AVTN. AVTN is not only adapting the backbone to the head but also increasing the learning capacity of the overall object detection models. In addition, AVTN has orders of magnitude less trainable parameters than the backbone, head, or OD model. Thus, leveraging AVTN, one is able to create these new models at up to 99% less training cost compared to the current training approach.

The impact of combining sub-models on the overall object detection design space is also investigated. Quantify the object detection design space with two main dimensions: accuracy and computation requirement. For accuracy, use the mAP of the model on the COCO dataset. For computation requirement, use the total number of parameters of the model. Other metrics for computation requirement include training/inference time and the number of operations (FLOPS). Use the number of parameters of the model because it represents both the compute intensity of the model as well as potential requirement on the memory and storage capacity of the hardware.

Figures 7, 8:
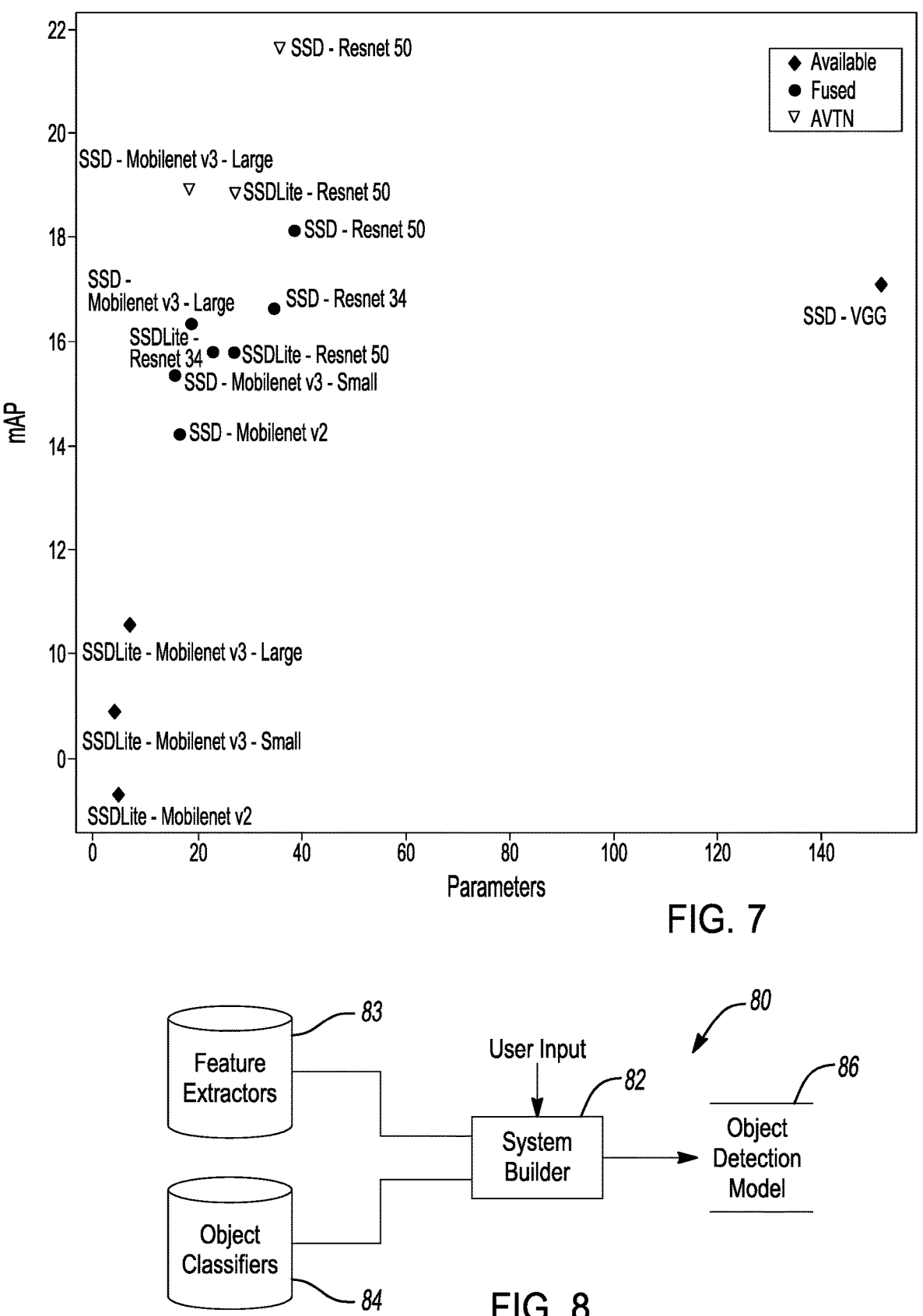
FIG. 7 is a visualization showing the object detection model design space.
FIG. 8 is a diagram depicting a system for constructing an object detection model.

FIG. 7 shows where each of the OD models evaluated in this work is located in this design space. Similar to Table 2, categorize the models into Available (existing OD model design), Fused (new models created by fusing and re-training), and AVTN (new models created with AVTN and no re-training). Observe that the new models, created by combining existing sub-models, populate the design space effectively and fill in areas of the space that were not covered before. It is worth noting that we are only visualizing the available models we have trained and tested ourselves (namely ones with SSD and SSDLite head) so the full set of currently available models will have better coverage of the design space than shown here. Nonetheless, this shows that composing new combinations of sub-models can effectively lead to the creation of new models with unique design profiles and characteristics, which is further accelerated by the low training cost of the AVTN.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein as seen in FIG. 8. The apparatus 80 is comprised primarily of a system builder 82 and two data repositories 83, 84. The first data repository 83 stores at least one (and preferably more than one) pre-trained feature extractors, where each feature extractor is configured to receive an image and operates to extract features from the image. The second data repository 84 stores at least one (and preferably more than one) pre-trained object classifier, where each object classifier is configured to receive a set of features and operates to classify the features as an object.

During operation, the system builder 82 receives a selection of a given feature extractor stored in the first data repository from a system user and a selection of a given object classifier stored in the second data repository from the system user. The system builder 82 is turn introduces translation layers to interconnect the output from the given feature extractor to the input of the given object classifier. The system builder 82 trains the translation layers and thereby generates an object detection module 86.

This apparatus 80 may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for constructing an object detection system, the method comprising:

providing two or more pre-trained feature extractors, where each feature extractor of the two or more feature extractors is configured to receive an image and extract features from the image;

providing one or more pre-trained object classifiers, where each object classifier of the one or more object classifiers is configured to receive a set of features and classify the features in the set of features as an object;

selecting a given feature extractor from the two or more feature extractors and a given object classifier from the one or more object classifiers;

introducing translation layers to interconnect output from the given feature extractor to input of the given object classifier; and training the translation layers.

2. The method of claim 1 wherein the translation layers are further defined as convolutional neural network.

3. The method of claim 1 wherein the translation layers consist of a convolutional layer, a batch normalization layer and an activation layer.

4. The method of claim 1 wherein the translation layers consist of a first convolutional layer, a first batch normalization layer and a first activation layer followed by a second convolutional layer, a second batch normalization layer and a second activation layer.

5. The method of claim 1 wherein each feature extractor of the two or more feature extractors is further defined as a first neural network and each object classifier of the one or more object classifiers is further defined as a second neural network.

6. The method of claim 5 wherein training the translation layers includes retraining at least one layer of the given feature extractor.

7. A non-transitory computer-readable medium having computer-executable instructions that, upon execution of the instructions by a processor of a computer, cause the computer to provide two or more pre-trained feature extractors, where each feature extractor of the two or more feature extractors is configured to receive an image and extract features from the image;

provide one or more pre-trained object classifiers, where each object classifier of the one or more object classifiers is configured to receive a set of features and classify the features in the set of features as an object;

receive a selection of a given feature extractor from the two or more feature extractors;

receive a selection of a given object classifier from the one or more object classifiers;

interconnecting output from the given feature extractor to input of the given object classifier via translation layers; and train the translation layers.

8. The non-transitory computer-readable medium of claim 7 wherein the computer-executable instructions further cause the computer to train the translation layers by retraining at least one layer of the given feature extractor.

9. The non-transitory computer-readable medium of claim 7 wherein the translation layers are further defined as convolutional neural network.

10. The non-transitory computer-readable medium of claim 7 wherein the translation layers consist of a convolutional layer, a batch normalization layer and an activation layer.

US 12,639,931 B2

11

11. The non-transitory computer-readable medium of claim 7 wherein the translation layers consist of a first convolutional layer, a first batch normalization layer and a first activation layer followed by a second convolutional layer, a second batch normalization layer and a second activation layer.

12. The non-transitory computer-readable medium of claim 7 wherein each feature extractor of the two or more feature extractors is further defined as a first neural network and each object classifier of the one or more object classifiers is further defined as a second neural network.

\* \* \* \* \*